(12) United States Patent
Tsao et al.

(10) Patent No.: US 6,718,219 B2
(45) Date of Patent: Apr. 6, 2004

(54) PRODUCTION CONTROL SYSTEM AND METHOD FOR ASSIGNING FABRICATION FACILITY PRODUCTION DEMAND

(75) Inventors: Piao-Chao Tsao, Bode (TW); Chii-Ming M. Wu, Hsinchu (TW); John Chin, Hsin Chu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 38 days.

(21) Appl. No.: 10/102,284

(22) Filed: Mar. 20, 2002

(65) Prior Publication Data

US 2003/0182007 A1 Sep. 25, 2003

(51) Int. Cl.$^7$ .......................... G06F 17/30; G06F 19/00
(52) U.S. Cl. ..................... 700/99; 700/90; 700/117; 705/8
(58) Field of Search ..................... 700/90, 95, 110, 700/117, 121, 99, 28, 32; 705/7, 8

(56) References Cited

U.S. PATENT DOCUMENTS

| | | | |
|---|---|---|---|
| 5,544,062 A | * | 8/1996 | Johnston, Jr. ............... 700/117 |
| 5,612,886 A | * | 3/1997 | Weng ......................... 700/101 |
| 5,768,133 A | | 6/1998 | Chen et al. |
| 5,826,040 A | | 10/1998 | Fargher et al. |
| 5,894,571 A | * | 4/1999 | O'Connor ..................... 713/2 |

* cited by examiner

Primary Examiner—Jayprakash N. Gandhi
(74) Attorney, Agent, or Firm—Tung & Associates

(57) ABSTRACT

Within both a computer assisted system for assigning a production demand within a plurality of fabrication facilities and a computer assisted method for assigning the production demand within the series of fabrication facilities, there is discriminated with respect to the production demand an existing product production demand content and a new product production demand content. The former is assigned to at least one qualified fabrication facility within the plurality of fabrication facilities and the latter is assigned to only one capable fabrication facility within the plurality of fabrication facilities.

18 Claims, 2 Drawing Sheets

Qualified Fabrication Facility Balance Table

| Existing Product Code | Qualified Fab Facility | Percentage |
|---|---|---|
| TM1111 | Fab3 | 50% |
| TM1111 | Fab4 | 20% |
| TM1111 | Fab7 | 30% |
| TM2222 | Fab4 | 60% |
| TM2222 | Fab5 | 40% |
| TM3333 | Fab6 | 100% |

FIG. 2

Capable, Fabrication Facility Availability Table

| Micron Code | Technology Function | Capable Fab Facility | Availability |
|---|---|---|---|
| 025 | LL01 | Fab3 | Current |
| 025 | LL01 | Fab5 | Current |
| 025 | LL01 | Fab7 | Current |
| 025 | LL01 | Fab8 | Current |
| 018 | LL03 | Fab5 | Current |
| 018 | LL03 | Fab6 | Current |
| 018 | LL03 | Fab8 | 8 Months |
| 018 | LL03 | Fab12 | 12 Months |

FIG. 3

PRODUCTION CONTROL SYSTEM AND METHOD FOR ASSIGNING FABRICATION FACILITY PRODUCTION DEMAND

BACKGROUND OF THE INVENTION

1. Field of the Invention

The present invention relates generally to production control systems and methods for assigning fabrication facility production demand. More particularly, the present invention relates to production control systems and methods for flexibly assigning fabrication facility production demand.

2. Description of the Related Art

Microelectronic fabrications are formed from microelectronic substrates over which are formed patterned microelectronic conductor layers which are separated by microelectronic dielectric layers.

Common in the art of microelectronic fabrication for use when fabricating microelectronic fabrications within microelectronic fabrication facilities is the use of production control systems for assigning and scheduling microelectronic fabrication production demand and microelectronic fabrication work in process (WIP) workload within microelectronic fabrication facilities. Production control systems are desirable in the art of microelectronic fabrication for assigning and scheduling microelectronic fabrication production demand and microelectronic fabrication work in process (WIP) workload within microelectronic fabrication facilities insofar as absent production control systems within fabrication facilities, such as but not limited to microelectronic fabrication facilities, production from such facilities is often not readily efficiently realized.

While production control systems are thus clearly desirable in the art of microelectronic fabrication and often essential in the art of microelectronic fabrication, production control systems are nonetheless not entirely without problems in the art of microelectronic fabrication.

In that regard, production control systems do not always provide optimal flexibility with respect to assigning and scheduling production demand and work in process (WIP) workload within fabrication facilities, such as microelectronic fabrication demand and work in process (WIP) workload within microelectronic fabrication facilities.

It is thus desirable in the art of microelectronic fabrication to provide production control systems with enhanced flexibility for assigning and scheduling microelectronic fabrication production demand within microelectronic fabrication facilities.

It is towards the foregoing object that the present invention is directed.

Various production control systems and methods have been disclosed within various fabrication arts for assisting in operation of fabrication facilities as employed within the various fabrication arts.

Included among the production control systems and methods, but not limited among the production control systems and methods, are production control systems and methods disclosed within: (1) Chen et al., in U.S. Pat. No. 5,768,133 (a production control work in process (WIP) workload management system and method which provide for enhanced efficiency when managing a work in process (WIP) workload within a fabrication facility, such as a microelectronic fabrication facility, by employing interactive data processing capabilities within the production control work in process (WIP) workload management system and method); and (2) Fargher et al., in U.S. Pat. No. 5,826,040 (a computer assisted production control system and method for production planning with enhanced efficiency within a fabrication facility, such as a microelectronic fabrication facility, by employing a fuzzy logic algorithm within a computer employed within the computer assisted production control system and method).

Desirable in the art of microelectronic fabrication are additional systems and methods which may be employed for more flexibly managing microelectronic fabrication production within microelectronic fabrication facilities.

It is towards the foregoing object that the present invention is directed.

SUMMARY OF THE INVENTION

A first object of the present invention is to provide a system and a method for managing production within a microelectronic fabrication facility.

A second object of the present invention is to provide the system and the method in accord with the first object of the present invention, wherein the production is flexibly managed within the microelectronic fabrication facility.

A third object of the present invention is to provide a system and a method in accord with the first object of the present invention and the second object of the present invention, wherein the system and the method are readily commercially implemented.

In accord with the objects of the present invention, there is provided by the present invention a computer assisted system for assigning a production demand within a fabrication facility and a computer assisted method for assigning the production demand within the fabrication facility.

In accord with the present invention, the computer assisted system for assigning the production demand comprises in a first instance a plurality of fabrication facilities, where the plurality of fabrication facilities has a first sub-plurality of fabrication facilities qualified for producing an existing product and a second sub-plurality of fabrication facilities capable of producing a new product. In accord with the present invention, the computer assisted system also comprises a computer programmed such as to: (1) receive a production demand; (2) discriminate an existing product production demand content of the production demand and a new product production demand content of the production demand; and (3) assign the existing product production demand content within at least one fabrication facility within the first sub-plurality of fabrication facilities and assign the new product production demand content within a single fabrication facility within the second sub-plurality of fabrication facilities.

The computer assisted system for assigning the production demand within the fabrication facility in accord with the present invention contemplates the computer assisted method for assigning the production demand within the fabrication facility in accord with the present invention.

The present invention provides a system and a method for managing production within a fabrication facility, such as a microelectronic fabrication facility, wherein the system and the method provide for flexibly managing the production within the fabrication facility, such as the microelectronic fabrication facility.

The system of the present invention and the method of the present invention realize the foregoing object with respect to a plurality of fabrication facilities by providing for assigning production demand for an existing product within at least one fabrication facility within a sub-plurality of fabrication facilities qualified for producing the existing product, while assigning production demand for a new product within only a single fabrication facility within a sub-plurality of fabrication facilities capable of producing the new product.

The system of the present invention and the method of the present invention are readily commercially implemented.

The present invention employs data acquisition apparatus and data processing apparatus as are generally conventional in arts including but not limited to microelectronic fabrication arts, but programmed and assembled such as to effect the objects of the present invention. Since it is thus at least a programming of a data acquisition apparatus and a data processing apparatus which provides at least in part the present invention, rather than the existence of the data acquisition apparatus and the data processing apparatus which provides the present invention, the system of the present invention and the method of the present invention are readily commercially implemented.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein:

FIG. 2 shows a Qualified Fabrication Facility Balance Table for use in accord with the method of the present invention and the system in accord with the present invention.

FIG. 3 shows a Capable Fabrication Facility Availability Table for use in accord with the method of the present invention and the system in accord with the present invention.

DESCRIPTION OF THE PREFERRED EMBODIMENT

Figure 1:
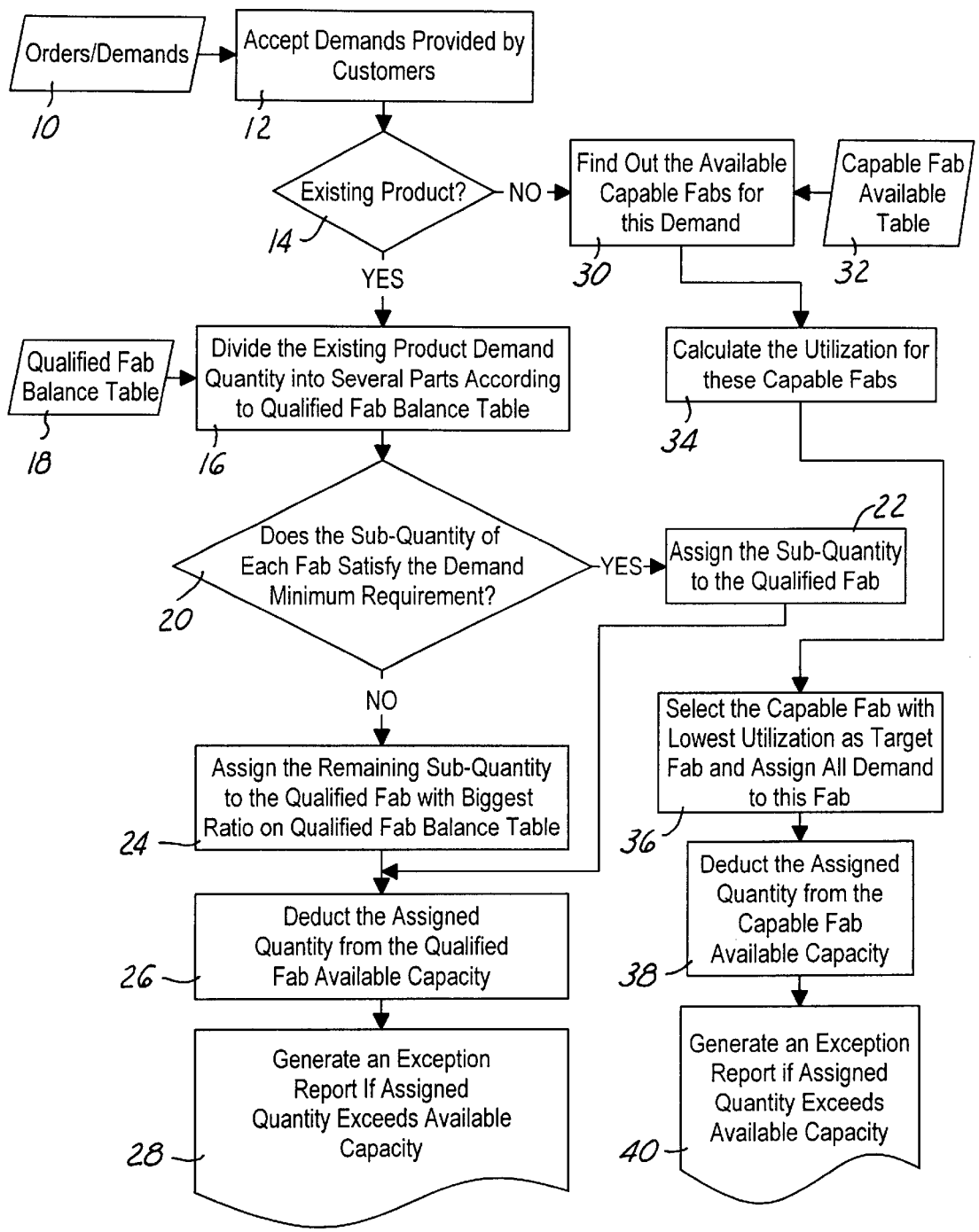
FIG. 1 shows a schematic block diagram illustrating a preferred embodiment of a method in accord with the present invention which may be practiced in accord with a system in accord with the present invention.

The present invention provides a method and a system for managing production demand (i.e., product orders) within a fabrication facility, such as a microelectronic fabrication facility, wherein the system and the method provide for flexibly managing the production demand within the fabrication facility, such as the microelectronic fabrication facility.

The system of the present invention and the method of the present invention realize the foregoing object with respect to a plurality of fabrication facilities by providing for assigning production demand for an existing product within at least one fabrication facility within a sub-plurality of fabrication facilities qualified for producing the existing product, while assigning production demand for a new product within only a single fabrication facility within a sub-plurality of fabrication facilities capable of producing the new product.

While the present invention and the preferred embodiment of the present invention provide particular value within the context of managing production demand within microelectronic fabrication facilities, the present invention nonetheless may be employed for managing production demand within fabrication facilities including but not limited to electronic fabrication facilities, microelectronic fabrication facilities, mechanical fabrication facilities, micromechanical fabrication facilities and chemical fabrication facilities.

In a first instance, the system in accord with the present invention comprises a plurality of fabrication facilities, wherein the plurality of fabrication facilities has a first sub-plurality of fabrication facilities qualified for producing an existing product and a second sub-plurality of fabrication facilities capable of producing a new product.

Within the present invention and the preferred embodiment of the present invention the first sub-plurality of fabrication facilities may (and typically will) overlap either completely or in part with the second sub-plurality of fabrication facilities, although the first sub-plurality of fabrication facilities may be completely separate from the second sub-plurality of fabrication facilities. Similarly, within the context of the present invention and the preferred embodiment of the present invention an existing product is intended as a product which has been qualified for production within, and is fact typically has been produced within, each of the first sub-plurality of fabrication facilities. In addition, within the context of the present invention and the preferred embodiment of the present invention a new product is intended as a product which has not been qualified for production (more generally actually produced) within any of the second sub-plurality of fabrication facilities, but rather wherein there nonetheless exists within the second sub-plurality of fabrication facilities appropriate capabilities for fabricating the new product therein. Such appropriate capabilities are generally defined in terms of fabrication process tooling needed to fabricate the new product to the new product's design limitations.

In a second instance, the system in accord with the present invention comprises a computer, which is generally a digital computer, programmed such as to effect the method of the present invention, as disclosed in greater detail as follows.

Referring now to FIG. 1, there is shown a schematic block diagram illustrating a preferred embodiment of the method in accord with the present invention which may be practiced in accord with the system in accord with the present invention.

As is illustrated within FIG. 1, and in accord with the blocks which correspond with reference numeral 10 and reference numeral 12, there is first provided a production demand (i.e. a product order) by a customer, and the production demand is accepted into the computer assisted system in accord with the present invention.

Referring again to FIG. 1, and in accord with the inquiry block which corresponds with reference numeral 14, the system in accord with the present invention makes an inquiry as to whether the production demand which has been accepted into the system of the present invention is directed towards production of an existing product or production of a new product. While the inquiry block which corresponds with reference numeral 14 suggests that a production demand is accepted as either an existing product production demand or a new product production demand, the present invention also contemplates that a production demand may comprise and be accepted as both an existing product production demand content and a new product production demand content. The foregoing two contents may be further discriminated and processed in accord with the present invention.

Within the context of the present invention, and as indicated above, existing products are products for which there exists a production history within at least one, and preferably several, qualified fabrication facilities within which the existing product has previously been produced. Similarly, and also within the context of the present invention, and also as indicated above, new products are products for which there exists no production history within any fabrication facility, but for which there nonetheless exists at least one fabrication facility having production capability for the new products.

Referring again to FIG. 1, and in accord with the block which corresponds with reference numeral 16, and if the production demand is directed towards an existing product, the system in accord with the present invention will automatically divide the existing product production demand into several sub-quantities in accord with a Qualified Fabrication Facility Balance Table in accord with the block which corresponds with reference numeral 18. A typical Qualified Fabrication Facility Balance Table is shown within FIG. 2, wherein it is illustrated, for example, that: (1) a production demand for an existing product code TM1111 would be divided among fabrication facilities designated as Fab 3, Fab 4 and Fab 7 in a volume percentage of 50 percent, 20 percent and 30 percent, respectively; (2) a production demand for an existing product code TM2222 would be divided among fabrication facilities designated as Fab 4 and Fab 5 in a volume percentage of 60 percent and 40 percent, respectively; and (3) a production demand for an existing product code TM3333 would be assigned in its entirety to a fabrication facility designated as Fab 6.

Referring again to FIG. 1, and in accord with the inquiry block which corresponds with reference numeral 20, an additional inquiry is made as to whether the sub-quantities of the existing product production demand determined in accord with the block which corresponds with reference numeral 16 (and further in accord with the Qualified Fabrication facility Balance Table in accord with the block which corresponds with reference numeral 18) satisfy a minimum demand requirement for each of the qualified fabrication facilities to which the existing product production demand has been divided. If yes, and in accord with the block which corresponds with reference numeral 22, the sub-quantities of the existing product production demand are assigned to the corresponding series of qualified fabrication facilities to which they were originally divided. Similarly, if not, and in accord with the block which corresponds with reference numeral 24, existing product production demand quantities which do not comply with minimum demand requirements are instead assigned to the qualified fabrication facility having the highest percentage demand within the Qualified Fabrication Facility Balance Table.

Referring again to FIG. 1, and in accord with the block which corresponds with reference numeral 26, and with respect to each of the selected qualified fabrication facilities to which there is assigned an existing product production demand, there is deducted the assigned existing product production demand quantity from the available qualified fabrication facility available capacity.

Finally, and referring again to FIG. 1 and in accord with the block which corresponds with reference numeral 28, there is generated an exception report under circumstances where the assigned existing product production demand quantity exceeds a qualified fabrication facility available capacity.

Referring again to FIG. 1, and if the result of the inquiry block which corresponds with reference numeral 14 provides that the production demand is for a new product which has not previously been produced within any of the fabrication facilities, and further in accord with the blocks which correspond with reference numeral 30 and reference numeral 32, there is first determined the existence and number of capable fabrication facilities which have a production capability capable of meeting the new product production demand, in accord with a Capable Fabrication Facility Availability Table.

A typical Capable Fabrication Facility Availability Table is shown within FIG. 3, wherein, for example, the capable fabrication facilities are listed in terms of a micron code, which is intended as a minimum dimension linewidth, as well as technology function, which in turn might be intended as a technology type designation (i.e., logic microelectronic fabrication or memory microelectronic fabrication). Within the Capable Fabrication Facility Availability Table of FIG. 3, fabrication facilities designated as Fab 3, Fab 5, Fab 7 and Fab 8 are indicated as currently being capable for production of a 0.25 micron linewidth new product. Similarly, fabrication facilities designated as Fab 5 and Fab 6 are designated as currently capable for production of a 0.18 micron linewidth new product, with a fabrication facility designated as Fab 8 intended to have such capabilities in 8 months time and a fabrication facility designated as Fab 12 intended to have such capabilities in 12 months time.

Referring again to FIG. 1, and in accord with the block which corresponds with reference numeral 34, there is then calculated a present utilization for the candidate available capable fabrication facilities for the new product production demand. And further in accord with the block which corresponds with reference numeral 36, there is then selected the available capable fabrication facility with the lowest utilization rate as a single assigned fabrication facility to fabricate all of the new product production demand.

Referring again to FIG. 1, and in accord with the block which corresponds with reference numeral 38, there is then deducted the assigned new product production demand quantity from the capable fabrication facility available capacity. Further, and in accord with the block which corresponds with reference numeral 40, there is then generated an exception report should the assigned new product production demand quantity exceeds the assigned capable fabrication facility available capacity.

Upon execution of the preferred embodiment of the method of the present invention as illustrated in accord with the schematic block diagram of FIG. 1 in accord with a computer assisted system of the preferred embodiment of the present invention, there is provided in accord with the present invention a method for assigning production demand within a fabrication facility, such as a microelectronic fabrication facility, and a system for assigning production demand within the fabrication facility, such as the microelectronic fabrication facility, where the method and the system provide that the production demand is flexibly assigned.

The present invention realizes the foregoing object within the context of a plurality of fabrication facilities by assigning production demand for an existing product to a minimum of one fabrication facility (but preferably several fabrication facilities) within a sub-plurality of fabrication facilities qualified for producing the existing product and assigning production demand for a new product to only one fabrication facility within a sub-plurality of fabrication facilities capable of producing the new product. As is understood by a person skilled in the art, the foregoing discrimination and assignment of production demand provides for: (1) enhanced and adequate back-up production of existing product production demand; and (2) effective start-up production of new product production demand with limited interference which might otherwise be encountered if the start-up production was simultaneously undertaken within multiple fabrication facilities.

As is understood by a person skilled in the art, the preferred embodiment of the present invention is illustrative of the present invention rather than limiting of the present invention. Revisions and modifications may be made to the system in accord with the preferred embodiment of the present invention and the method in accord with the preferred embodiment of the present invention, while still providing a system in accord with the present invention and a method in accord with the present invention, further in accord with the accompanying claims.

What is claimed is:

1. A computer assisted system for assigning production demand comprising:
   a plurality of fabrication facilities, the plurality of fabrication facilities having a first sub-plurality of fabrication facilities qualified for producing an existing product and a second sub-plurality of fabrication facilities capable of producing a new product; and
   a computer programmed such as to:
      receive a production demand;
      discriminate an existing product production demand content of the production demand and a new product production demand content of the production demand; and
      assign the existing product production demand content to at least one fabrication facility within the first sub-plurality of fabrication facilities and the new product production demand content to only a single fabrication facility within the second sub-plurality of fabrication facilities.

2. The system of claim 1 wherein the plurality of fabrication facilities is selected from the group consisting of electronic fabrication facilities, microelectronic fabrication facilities, mechanical fabrication facilities, micromechanical fabrication facilities and chemical fabrication facilities.

3. The system of claim 1 wherein the first sub-plurality of fabrication facilities overlaps, at least in part, the second sub-plurality of fabrication facilities.

4. The system of claim 1 wherein the first sub-plurality of fabrication facilities does not overlap the second sub-plurality of fabrication facilities.

5. The system of claim 1 wherein the computer is programmed such as to assign the existing product production demand content to a plurality of fabrication facilities within the first sub-plurality of fabrication facilities.

6. A computer assisted system for assigning production demand comprising:
   a plurality of microelectronic fabrication facilities, the plurality of microelectronic fabrication facilities having a first sub-plurality of microelectronic fabrication facilities qualified for producing an existing product and a second sub-plurality of microelectronic fabrication facilities capable of producing a new product; and
   a computer programmed such as to:
      receive a production demand;
      discriminate an existing product production demand content of the production demand and a new product production demand content of the production demand; and
      assign the existing product production demand content within at least one microelectronic fabrication facility within the first sub-plurality of microelectronic fabrication facilities and the new product production demand content within only a single microelectronic fabrication facility within the second sub-plurality of microelectronic fabrication facilities.

7. The system of claim 6 wherein the first sub-plurality of microelectronic fabrication facilities overlaps, at least in part, the second sub-plurality of microelectronic fabrication facilities.

8. The system of claim 6 wherein the first sub-plurality of microelectronic fabrication facilities does not overlap the second sub-plurality of microelectronic fabrication facilities.

9. The system of claim 6 wherein the computer is programmed such as to assign the existing product production demand content to a plurality of microelectronic fabrication facilities within the first sub-plurality of microelectronic fabrication facilities.

10. A computer assisted method for assigning production demand comprising:
    providing a plurality of fabrication facilities, the plurality of fabrication facilities having a first sub-plurality of fabrication facilities qualified for producing an existing product and a second sub-plurality of fabrication facilities capable of producing a new product;
    providing a computer programmed such as to:
       receive a production demand;
       discriminate an existing product production demand content of the production demand and a new product production demand content of the production demand; and
       assign the existing product production demand content to at least one fabrication facility within the first sub-plurality of fabrication facilities and the new product production demand content to only a single fabrication facility within the second sub-plurality of fabrication facilities; and
    providing a production demand to the computer.

11. The method of claim 10 wherein the plurality of fabrication facilities is selected from the group consisting of electronic fabrication facilities, microelectronic fabrication facilities, mechanical fabrication facilities, micromechanical fabrication facilities and chemical fabrication facilities.

12. The method of claim 10 wherein the first sub-plurality of fabrication facilities overlaps, at least in part, the second sub-plurality of fabrication facilities.

13. The method of claim 10 wherein the first sub-plurality of fabrication facilities does not overlap the second sub-plurality of fabrication facilities.

14. The method of claim 10 wherein the computer is programmed such as to assign the existing product production demand content to a plurality of fabrication facilities within the first sub-plurality of fabrication facilities.

15. A method for assigning production demand comprising:
    providing a plurality of microelectronic fabrication facilities, the plurality of microelectronic fabrication facilities having a first sub-plurality of microelectronic fabrication facilities qualified for producing an existing product and a second sub-plurality of microelectronic fabrication facilities capable of producing a new product; and
    providing a computer programmed such as to:
       receive a production demand;
       discriminate an existing product production demand content of the production demand and a new product production demand content of the production demand; and assign the existing product production demand content to at least one microelectronic fabrication facility within the first sub-plurality of microelectronic fabrication facilities and the new product production demand content to only a single microelectronic fabrication facility within the second sub-plurality of microelectronic fabrication facilities; and providing a production demand to the computer.

16. The method of claim 15 wherein the first sub-plurality of microelectronic fabrication facilities overlaps, at least in part, the second sub-plurality of microelectronic fabrication facilities.

17. The method of claim 15 wherein the first sub-plurality of microelectronic fabrication facilities does not overlap the second sub-plurality of microelectronic fabrication facilities.

18. The method of claim 15 wherein the computer is programmed such as to assign the existing product production demand content to a plurality of microelectronic fabrication facilities within the first sub-plurality of microelectronic fabrication facilities.

* * * * *